United States Patent [19]

Odor et al.

[11] Patent Number: 5,020,606
[45] Date of Patent: Jun. 4, 1991

[54] RECIPROCATING ROTARY TOOL DRIVER

[75] Inventors: Louis Odor; Herman O. Hamilton, both of Columbus, Ohio

[73] Assignee: Rockwell International Corporation, El Segundo, Calif.

[21] Appl. No.: 529,675

[22] Filed: May 29, 1990

Related U.S. Application Data

[63] Continuation of Ser. No. 289,943, Dec. 27, 1988, abandoned.

[51] Int. Cl.$^5$ ............................................... E21B 3/00
[52] U.S. Cl. ............................................ 173/163; 74/25
[58] Field of Search ................. 173/12, 104, 105, 163; 74/57, 56, 22 R, 22 A, 25; 51/34 R

[56] References Cited

U.S. PATENT DOCUMENTS 4,712,625 12/1987 Kress ............................... 173/104
4,732,218 3/1988 Neumaier et al. ................ 173/105

Primary Examiner—Joseph M. Gorski
Assistant Examiner—Willmon Fridie, Jr.
Attorney, Agent, or Firm—Charles T. Silberberg; Terrell P. Lewis; Max Geldin

[57] ABSTRACT

A reciprocating rotary tool driver is driven by a motive source which provides power to its tool through a splined shaft while the rotating tool is oscillated in a vertical mode by means of spur gear, worm gear, and crank means.

9 Claims, 3 Drawing Sheets

RECIPROCATING ROTARY TOOL DRIVER

This is a continuation of copending application 289,943 filed on Dec. 27, 1988 now abandoned.

BACKGROUND OF THE INVENTION

This invention relates to rotary cutter tools and more particularly to a cutter head which is driven in an oscillatory vertical motion while rotating at conventional cutter tool speeds.

Conventional router heads used for trimming and routing parts fabricated from state of the art materials such as titanium, columbium, inconel, stainless steel, composites, etc., represent such cutter tools and most of these suffer from a basic condition that the workpiece material does not dissipate heat fast enough for efficient router operation. Elaborate cutter cooling means must be used to prevent destruction of the cutter blade from overheating. The device proposed herein provides for a continuously moving cutter head so that only a small portion of the cutter is in contact with the workpiece during cutter oscillatory motion allowing the cutter to maintain reasonable temperatures and preserving cutting temper of its work surfaces. A variety of oscillatory or moving head work tools has been used in existing technology. U.S. Pat. No. 3,538,646 provides a cam/roller arrangement to operate a reciprocating grinder head, while U.S. Pat. No. 1,849,868 uses cam follower type differential gear ratio driver means to provide slow oscillatory motion of a high speed grinder head. Neither of the above provides the spur gear-worm gear versatility of the within invention which provides for almost unlimited variations of oscillatory frequency, degree of travel and rotary cutting speed.

It is a primary object of this invention to provide a rotary cutter mechanism designable for all types of router conditions and material useage which shows continuous oscillatory translation of a rotary cutter blade during cutting operations. A further object is to allow the use of oscillating head rotary router blades for all types of materials in both fixed tooling and hand held cutters.

SUMMARY OF THE INVENTION

The above objects are best achieved through use of conventional shop motive power such as compressed air or electricity in allowing a rotary, splined drive shaft to couple the power source to a conventional rotary cutting tool. The following discussion is premised on use of shop air and air driven motors available commercially for primary power sources.

The air motor output is coupled to a splined drive shaft and turns the shaft at the same rate of speed as a spur gear physically attached to it. The spur gear, in turn couples power to a pinion gear with a gear ratio adjustable to material requirements.

The pinion drives a shaft on which a worm is fixed, while the worm, in turn, drives a gear which turns a crank as its output tool. The crank end fits into a slot of a bushing in which rides the primary cutter splined shaft driver and, through a rotary bearing, the crank moves the bushing up and down as the crank rotates about its own axis, the rotary bearing allowing horizontal motion only of the crank end in the bushing slot with respect to the prime spline driver's vertical axis.

Ratio of pinion gear, to worm, to worm gear output speed, determines the frequency of oscillation of the cutter blade while crank offset, or crank piece displacement, determines the extent, or range of motion, of the cutter head.

Variations of gear ratios and crank offsets can provide a broad range of application for the disclosed cutter. A given set of these will be found appropriate for special types of workpiece and, while versatility could be designed into any given embodiment, the disclosure will be explained with a fixed set of gears suitable for a specific cutting or routing operation. The cutter of this invention is amenable to mounting on numerical control machinery or on swing arm manual control tooling, and even to hand held devices such as presented in FIG. 4.

DETAILED DESCRIPTION AND PREFERRED EMBODIMENT

Figure 1:
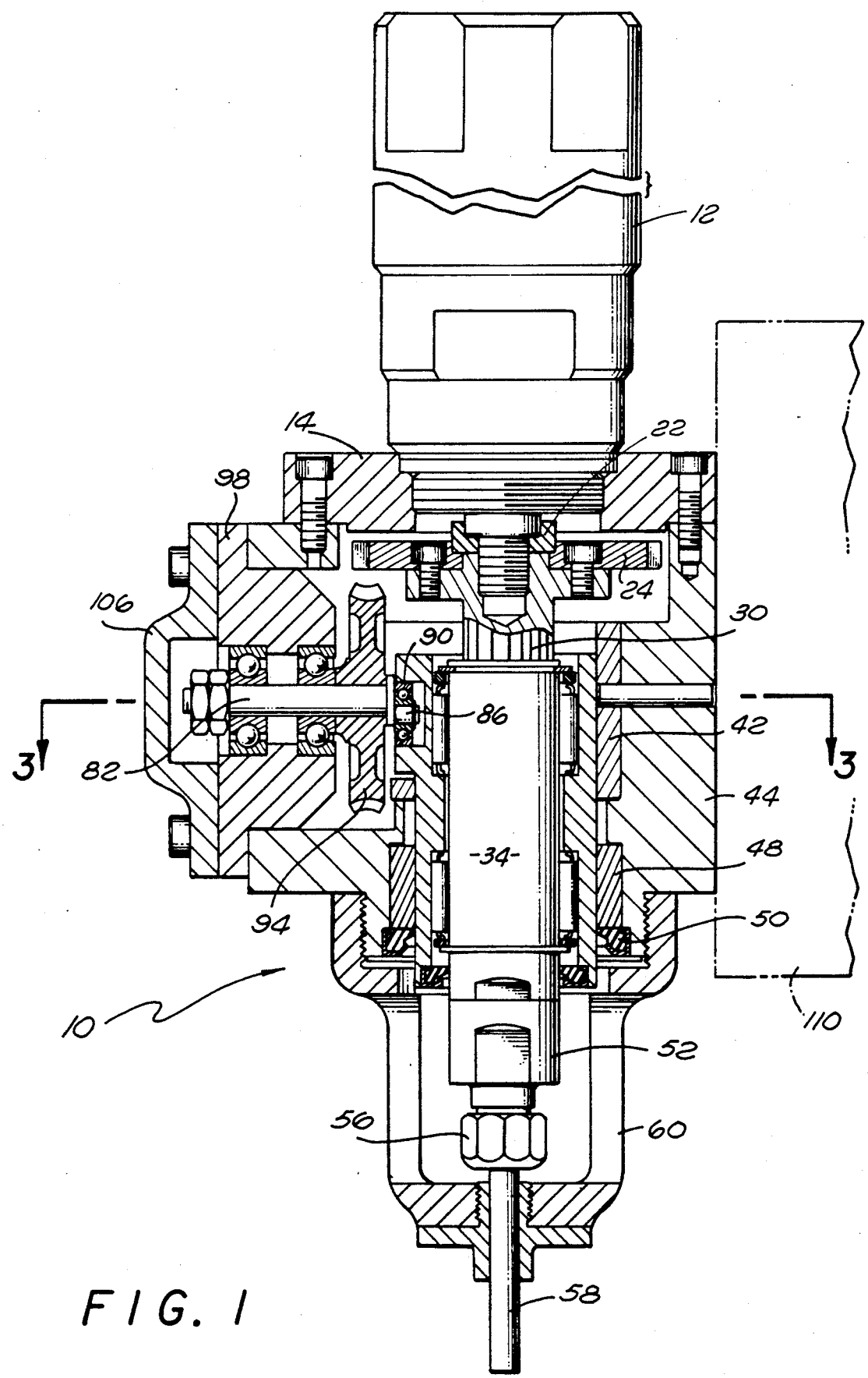
FIG. 1 is a sectional view of the reciprocating cutter tool according to this disclosure.
Figure 2:
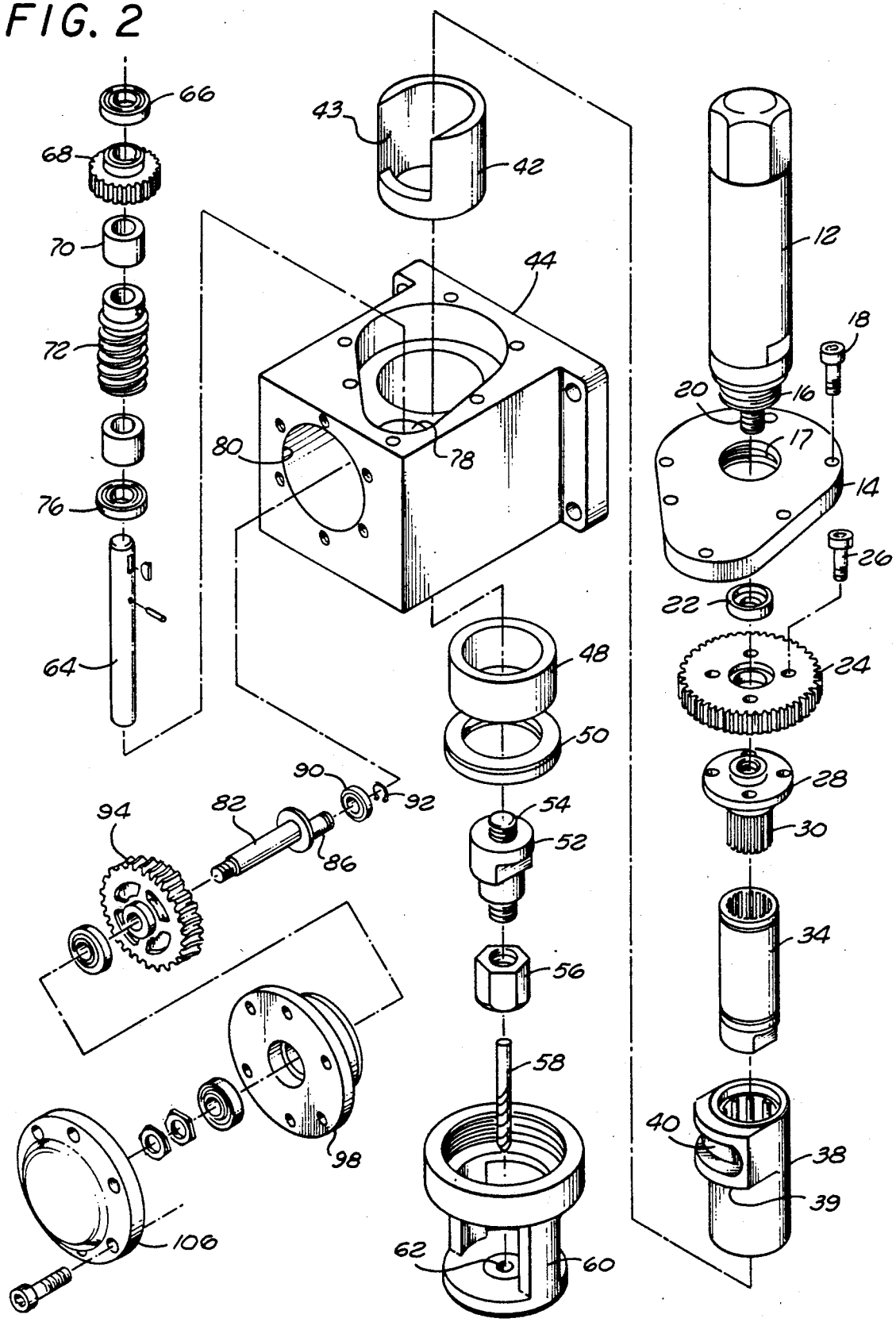
FIG. 2 is an exploded view of the component parts of the tool.
Figure 3:
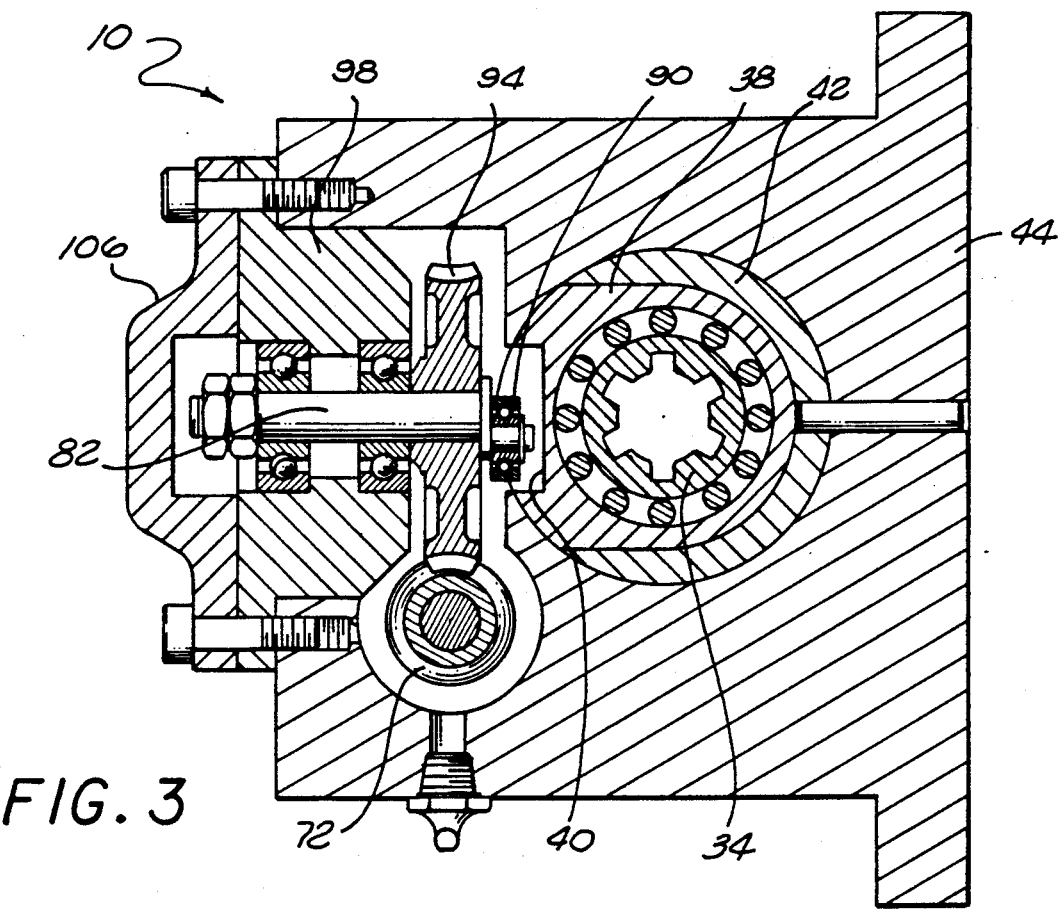
FIG. 3 is a sectional view taken on line 3—3 of FIG. 1.

FIG. 1 presents a sectional view of the cutter tool 10 of this invention as built for use with "shop air" as primary motive power. This primary power operates an air motor at a particular rotary speed. Throughout this disclosure, a specific embodiment of the invention will be described, but application to a broad range of tooling is contemplated hereby. While specific reference may be made to commercially available parts or units, any variation in ratio, size or composition is comprehended hereby, as claimed and described. While the preferred embodiment utilizes shop air as its motive force, electrical motors or fluid drive devices driving turbine means are contemplated and claimed.

Cutter 10 is powered by a motor 12 which may be of the type provided commercially as Rockwell model 41MF-904, EDP #47304, with a ½-20 threaded spindle. This motor has an output capacity of 0.75 horsepower, and this embodiment is designed for finish trimming of titanium sheet.

Motor 12 has an output shaft 20 driving spur gear 24 and spline gear 28 through an adaptor bushing 22. Motor 12 may be mounted to a tool cap 14 by means of its threads 16 and mating threads 17 of cap 14.

Spline gear 28 having axially extending splines 30 and spur gear 24 may be coupled together by screws 26 or any suitable coupling means such as detents, splines and bonding cement. Splines 30 of gear 28 mate with axially extending internal grooves 32 of spindle 34, permitting spindle 34 to move axially with respect to spline gear 28. Spindle 34 is fixed axially within sleeve 38 but is free to rotate about its central axis as driven by spline gear 28.

Sleeve 38 has a shoulder member 39 fitted to rest in cutout 43 of sleeve socket 42. Cutout 43 has a lateral dimension suitable to accommodate shoulder member 39 and restrain it to travel only in a vertical direction. Vertical travel of shoulder member 39 is controlled by the offset of a driving crank which will be discussed later. Shoulder member 39 has a horizontal slot or socket 40 designed to accept the driver end 86 of crank shaft 82 through bearing 90 as will also be discussed later.

Sleeve 38 is designed to move vertically inside sleeve socket 42 as driver element 86 of crank shaft 82 rotates. Driver element 86 of crank 82 mates with crank socket 40 through mounting port 80 of mounting 44. Ball bearing element 90, with diameter d, is axially fixed at the end of crank driver element 86 by such means as snap ring 92. Crankshaft 82 has the axis of crank driver element 86 displaced by an amount r from the axis of crankshaft 82. With ball bearing 90, of diameter d, attached to driver element 86, motion of the outer edge of bearing 90, as shaft 82 rotates, is around the perimeter of a circle of diameter 2r+d. Slot 40 in sleeve 38 is cut to a height of d and to a length of 2r+d. As shaft 82 makes one revolution, driver element 86 forces bearing 90 against the sides of slot 40, causing the sleeve 38 to move upward and downward a total travel of 2r as constrained by the edges of cutout 43 in sleeve socket 42.

Sleeve socket 42 is seated rigidly in tool mounting block 44 by cap 14 and its mounting screws 18.

Worm gear shaft 64 is driven to rotate in lower end bearing 76 mounted to block 44. Bearing 66 holds shaft 64 at its upper end and allows pinion gear 68 meshing with spur gear 24 to drive the shaft 64 at a rate proportional to the ratio of spur gear tooth number to pinion gear tooth number and spur gear 24 is coupled to pinion 68 inside block 44.

Cutout 78 in block 44 permits worm shaft 64 to be fixed axially in block 44 with rotational freedom. Pinion gear 68, meshed with spur gear 24, is separated from worm 72 on shaft 64 by spacer bushing 70.

In the embodiment described here, a 5 inch diameter spur gear drives a 2 inch diameter pinion for an amplification of 2.5 or from 800 cycles/min. to 2,000 cycles/min.

As pinion gear 68, keyed to shaft 64, turns at 2,000 rpm, worm 72, meshed with worm gear 94, allows gear 94 to drive crankshaft 82 at a rate of 2,000 divided by the number of teeth therein. For the embodiment selected, gear 94 has 32 teeth to provide a crank shaft speed of approximately 62 rpm, or 2,000 divided by 32. Crankshaft 82 with its worm gear driver, and assorted spacers and bearings, is held firmly in cutout 80 of mounting block 44 by support block 98 and end cap 106. Crank driver end 86 and ball bearing 90 are seated in slot 40 of sleeve 38, causing sleeve 38 to rise and fall with vertical displacement of bearing 90 riding smoothly in slot 40, caused by rotation of crankshaft 82 and eccentric driver end 86.

Spindle 34 is free to rotate within sleeve 38 but is fixed axially thereto and moves vertically with sleeve 38 as it is driven by crank driver 86 and bearing 90. Spindle 34 has chuck means 52 coupled to its lower extremity by means of threads 54 or such other securement means as may be preferred by the user. Bushing 48 and grease seal 50 provide for proper securing of chuck 52 to sleeve 38. Cutter 58, in the prototype described here, is secured to chuck 52 by chuck nut 56 or some other suitable chuck means. Cutter 58 passes through port 62 of router nose piece 60, which is, in turn, fixed solidly to block 44.

Figure 4:
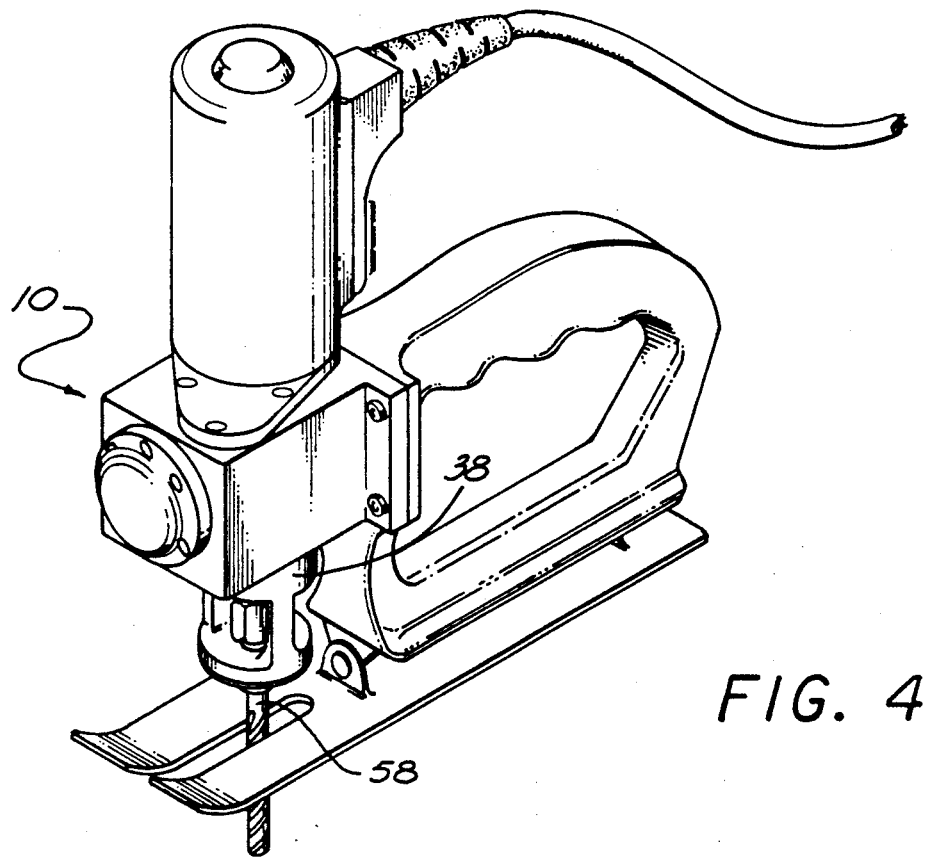
FIG. 4 is a perspective view of the cutter head of this invention incorporated into a hand-held tool for shop power use.

Block 44 and its rotary cutting equipment may be mounted to the controlled arm of automatic or numerically controlled nesting routers such as TRUMPH and CAMSCO systems, or may be built into portable, hand held units or fixed pin head routers as shown in FIG. 4.

We claim:
1. A rotary cutter tool driver comprising
motive means,
a rotatable cutter tool,
rotary drive means operatively coupling said cutter tool with said motive means,
an oscillatory drive mechanism operatively coupled to said motive means for effecting oscillatory motion of said cutter tool during rotation thereof, said oscillatory drive mechanism including
a pinion gear connected to said rotary drive means,
a worm actuated by said pinion gear,
a worm gear in operative engagement with said worm,
crank means actuated by said worm gear, and
means associated with said crank means, and mounted on said rotary drive means, for limiting movement of said rotatable cutter tool to oscillating motion along an axis thereof.

2. The rotary cutter tool driver of claim 1, including a spur gear on said rotary drive means, said spur gear being in operative engagement with said pinion gear.

3. The rotary cutter tool driver of claim 1, said worm being mounted along an axis of said pinion gear.

4. A rotary cutter tool driver comprising:
motive means,
a rotatable cutter tool,
rotary drive means for said cutter tool operated from said motive means,
an oscillatory drive mechanism operated from said motive means for oscillatory motion of said cutter tool during rotation thereof, said oscillatory drive mechanism including
a pinion gear connected to said rotary drive means,
a worm actuated by said pinion gear,
a worm gear in operative engagement with said worm,
crank means actuated by said worm gear, and
means associated with said crank means to cause oscillatory motion of said rotatable cutter tool along an axis thereof,
said crank means including a crankshaft driven by said worm gear and a crank driver element connected to said crankshaft and offset from an axis thereof,
said means associated with said crank means to cause oscillatory motion of said rotatable tool including a sleeve mounted on said rotary drive means, and means restraining said sleeve against rotary motion and permitting movement thereof only in a vertical direction, including a substantially horizontal socket in said sleeve, said socket receiving said crank driver element to permit limited oscillatory vertical motion of said rotatable tool during actuation of said crankshaft.

5. The rotary cutter tool driver of claim 4, and including a bearing member axially mounted on an end of said crank driver element, said crank driver element forcing said bearing member against sides of said socket in said sleeve, to cause limited upward and downward travel of said sleeve and oscillatory motion of said cutter tool during rotation thereof.

6. The rotary cutter tool driver of claim 4, and including a spline gear on said rotary drive means, and spline gear having axially extending splines,
a spindle on said drive means, said spindle having axially extending internal grooves, said splines mating with said grooves, permitting said spindle to move axially with respect to said spline gear, means fixing said spindle within said sleeve for oscillatory vertical motion of said spindle with said sleeve, but permitting said spindle to rotate about its axis, and means fixing said cutter tool to said spindle for rotation therewith.

7. The rotary cutter tool driver of claim 4, including a spur gear on said rotary drive means, said spur gear being in operative engagement with said pinion gear, said rotary drive means also including a spline gear coupled together with said spur gear on an axis of said rotary drive means, a spindle mounted on said axis, said spindle including internal grooves, the splines of said spline gear mating with the internal grooves of said spindle, said sleeve mounted on said axis, said spindle being fixed axially within said sleeve but free to rotate as driven by said spline gear, and means connecting said spindle with said rotatable cutter tool.

8. The rotary cutter tool driver of claim 4, with the ratio of pinion gear, to worm, to worm gear output determining the frequency of oscillation of the cutter tool, and the crank driver offset determining the extent of oscillatory motion of the cutter tool.

9. A rotary cutter tool driver comprising motive means, a rotatable cutter tool, rotary drive means for said cutter tool operated from said motive means, said rotary drive means and said cutter tool mounted on a common axis, said drive means including a spur gear mounted on said axis, a spline gear coupled together with said spur gear on said axis, said spline gear having axially extending splines, a spindle mounted on said axis, said spindle including internal grooves, the splines of said spline gear mating with the internal grooves of said spindle, means connecting said spindle with said rotatable cutter tool, an oscillatory drive mechanism operated from said motive means for oscillatory motion of said cutter tool during rotation thereof, said oscillatory drive mechanism including a pinion gear meshing with said spur gear, a worm mounted on an axis of said pinion gear, a worm gear meshing with said worm, a crankshaft driven by said worm gear, a crank driver end mounted on an end of said crankshaft and offset from an axis thereof, a bearing member axially mounted on the crank driver end, a sleeve mounted on the axis of said rotary drive means and said cutter tool, said spindle being fixed axially within said sleeve but free to rotate as driven by said spline gear, a horizontal slot in said sleeve, and means mounted on said rotary drive means axis to restrain said sleeve against rotary motion and to permit movement thereof only in an axial direction, said bearing member on said crank driver end received in said slot, and said crank driver end forcing said bearing member against sides of the slot in said sleeve to cause limited upward and downward travel of said sleeve and oscillatory motion of said cutter tool during rotation thereof.

* * * * *